(12) United States Patent
Aono et al.

(10) Patent No.: US 6,608,306 B1
(45) Date of Patent: Aug. 19, 2003

(54) SCANNING TUNNELING MICROSCOPE, ITS PROBE, PROCESSING METHOD FOR THE PROBE AND PRODUCTION METHOD FOR FINE STRUCTURE

(75) Inventors: Masakazu Aono, Wako (JP); Tomonobu Nakayama, Wako (JP); Kazuya Terabe, Saitama (JP)

(73) Assignees: Japan Science and Technology Corporation (JP); Riken (JP)

( * ) Notice: Subject to any disclaimer, the term of this patent is extended or adjusted under 35 U.S.C. 154(b) by 0 days.

(21) Appl. No.: 09/743,202

(22) PCT Filed: Nov. 16, 1999

(86) PCT No.: PCT/JP99/06385
§ 371 (c)(1),
(2), (4) Date: Jan. 8, 2001

(87) PCT Pub. No.: WO00/70325
PCT Pub. Date: Nov. 23, 2000

(30) Foreign Application Priority Data

May 13, 1999 (JP) .............................................. 11-132857

(51) Int. Cl.$^7$ .............................................. G01N 13/12
(52) U.S. Cl. .................... 250/306; 250/307; 250/423 F; 250/492.3
(58) Field of Search .......................... 250/492.2, 492.3, 250/306, 307, 423 F

(56) References Cited

U.S. PATENT DOCUMENTS 4,035,244 A  *  7/1977  Inque et al. ................. 347/163
4,896,044 A  *  1/1990  Li et al. .................... 250/492.3
4,907,195 A  *  3/1990  Kazan et al. ................ 365/118
4,968,390 A  * 11/1990  Bard et al. ..................... 204/15
5,015,323 A  *  5/1991  Gallagher .................... 156/345
5,043,578 A  *  8/1991  Guethner et al. ........... 250/307
5,274,234 A  * 12/1993  Garcia et al. ................ 250/307
5,294,465 A  *  3/1994  Gallagher .................... 427/523
5,323,375 A  *  6/1994  Ihara et al. .................. 369/126
5,689,494 A  * 11/1997  Ichikawa et al. ........... 369/126

* cited by examiner

*Primary Examiner*—Bruce Anderson
(74) *Attorney, Agent, or Firm*—Lorusso, Loud & Kelly

(57) ABSTRACT

The invention provides a probe for use with a scanning tunneling microscope, a method of treating the probe, and a method of fabricating a nano-structure, which facilitates formation of a continuous nano-structure. The probe for the scanning tunneling microscope is formed of an $Ag_2S$ crystal having both ion conductivity and electron conductivity. Voltage and tunnel current are applied between the probe and a substrate in order to move movable Ag ions to thereby grow, on the tip end of the probe, a projection (mini chip) composed of Ag ions or Ag atoms. The polarity of the applied voltage is reversed after the growth of the projection in order to return the Ag ions or Ag atoms constituting the grown projection (mini chip) into the $Ag_2S$ crystal to thereby contract the projection. Thus, the probe can have a projection composed of Ag ions or Ag atoms and a regulated shape. Further, the movable ions or atoms of the mixed-conductive material are transferred onto the substrate so as to form a nano-structure on the substrate.

5 Claims, 7 Drawing Sheets

F I G. 7
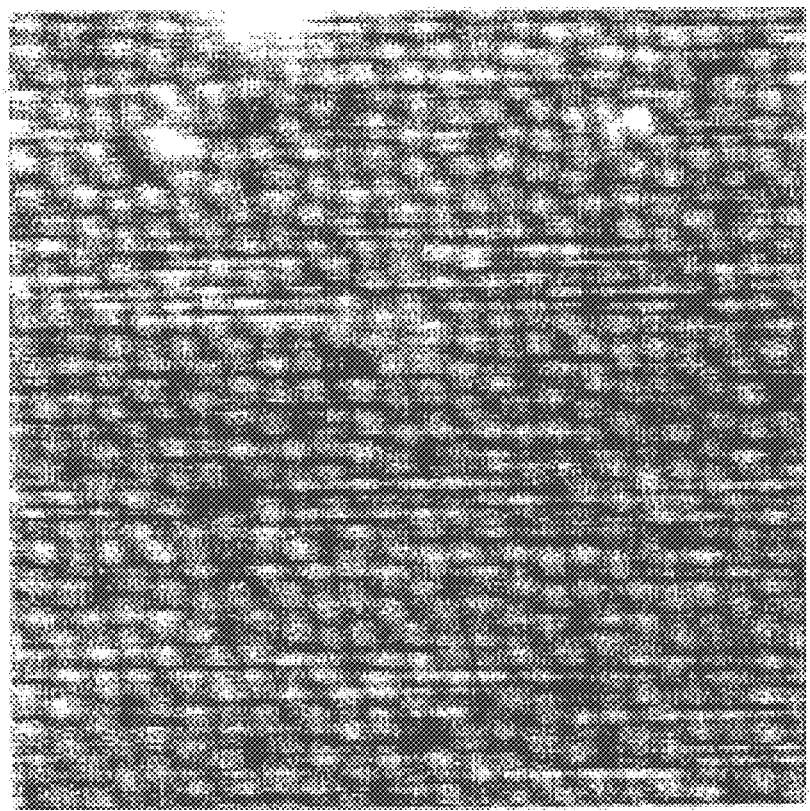

SCANNING TUNNELING MICROSCOPE, ITS PROBE, PROCESSING METHOD FOR THE PROBE AND PRODUCTION METHOD FOR FINE STRUCTURE

CROSS-REFERENCE TO RELATED APPLICATION

This application is a National Phase Application (35 USC 371) of PCT/JP99/06385 filed Nov. 16, 1999 and claims priority of Japanese Application No. 11-132857 filed May 13, 1999.

TECHNICAL FIELD

The present invention relates to a scanning tunneling microscope, a probe for use with the scanning tunneling microscope, a method of treating the probe, and a method of fabricating a nano-structure.

BACKGROUND ART

Conventional techniques in pertinent technical fields are disclosed in, for example, the papers listed below.

(1) H. J. Mamin, P. H. Guethner, and D. Rugar: Phys. Rev. Lett. 65 (1990) 2418.

(2) C. S. Chang, W. B. Su, and Tien T. Tsong: Phys. Rev. Lett. 72 (1994) 574.

(3) M. Takai, H. Andoh, H. Miyazaki, and T. Tsuruhara: Microelectronic Engineering 35 (1997) 353.

Among several proposed methods for fabricating nano-structures by use of an STM (scanning tunneling microscope), the following is closest to the present invention.

In many cases, the term STM stands for an apparatus for observation of a surface nano-structure on a conductive substrate which is performed by bringing a conductive probe close to the substrate so that the distance between the probe and the substrate becomes about 1 nanometer, and the voltage applied between or current flowing between the probe and the substrate is controlled and measured in order to observe the surface nano-structure. However, in the present invention, the term STM stands not only for an apparatus adapted for observation of a surface nano-structure on a substrate through measurement and control of voltage applied between or tunnel current flowing between a probe and the substrate, but also an apparatus adapted for micro-machining of the surface of a probe or a substrate through utilization of the effects of voltage applied between and tunnel current flowing between the probe and the substrate.

FIG. 1 is a schematic view showing such a conventional scanning tunneling microscope and the principle of a method of fabricating a nano-structure by use of the scanning tunneling microscope.

As shown in FIG. 1, a thin wire made of a metal used for fabrication of a structure is used as an STM probe 101. Voltage and tunnel current are applied between the STM probe 101 and a substrate 102. Through the effects of the voltage and, metal atoms 103 are transferred from the tip end of the STM probe 101 onto the substrate 102, resulting the formation of a nano-structure. Reference numeral 100 denotes a three-dimensional drive unit.

Further, a thin wire 111 which is made of a metal and which is coated with another metal 112 as shown in FIG. 2 has also been used as an STM probe 110. In this case as well, voltage and tunnel current are applied between the STM probe 110 and a substrate, and through the effects of the voltage and tunnel current, metal atoms are transferred from the tip end of the STM probe 110 onto the substrate, resulting the formation of a nano-structure.

DISCLOSURE OF THE INVENTION

However, when these conventional methods are used, atoms of a material metal are transferred intermittently onto a substrate in the form of clusters, or only a few metal atoms are transferred continuously onto the substrate. In other words, continuous supply of metal atoms from a probe to a substrate has been difficult to attain.

Therefore, it is difficult for the conventional method to fabricate a continuous nano-structure.

In view of the above-described problem, an object of the present invention is to provide a scanning tunneling microscope, a probe for use with the scanning tunneling microscope, a method of treating the probe, and a method of fabricating a nano-structure, which facilitate formation of a micro-structure.

In order to achieve the above object, the present invention provides:

[1] A scanning tunneling microscope characterized by being equipped with a probe formed of a mixed-conductive material having both ion conductivity and electron conductivity.

[2] A scanning tunneling microscope described in [1] above, characterized in that the mixed-conductive material is an $Ag_2S$ crystal.

[3] A scanning tunneling microscope described in [1] above, characterized in that the probe has a projection (mini chip) which is provided on the tip end of the mixed-conductive material and is grown or contracted through application of voltage and tunnel current between the probe and a substrate.

[4] A method of treating a probe for a scanning tunneling microscope comprising the steps of: preparing a probe for a scanning tunneling microscope formed of a mixed-conductive material having both ion conductivity and electron conductivity; applying voltage and tunnel current between the probe and a substrate in order to move movable metal ions within the mixed-conductive material to thereby grow on the tip end of the probe a projection (mini chip) composed of the metal ions (atoms); and reversing the polarity of the applied voltage after the growth of the projection in order to return the metal ions (atoms) constituting the grown projection (mini chip) into the mixed-conductive material to thereby contract the projection.

[5] A method of treating a probe for a scanning tunneling microscope described in [4] above, characterized in that an $Ag_2S$ crystal is used as the mixed-conductive material.

[6] A method of observing a nano-structure on the surface of a substrate, characterized in that voltage and tunnel current are applied between the substrate and a probe for a scanning tunneling microscope treated by the method described in [4] or [5] above.

[7] A method of fabricating a nano-structure by use of a probe for a scanning tunneling microscope formed of a mixed-conductive material having both ion conductivity and electron conductivity, characterized in that, through application of voltage and tunnel current between the probe and a substrate, a surface micro structure of the substrate is observed, and movable ions or atoms of the mixed-conductive material are transferred onto the surface of the substrate to thereby fabricate a nano-structure.

[8] A method of fabricating a nano-structure by use of a probe for a scanning tunneling microscope formed of a mixed-conductive material having both ion conductivity and electron conductivity, characterized in that, through application of voltage and tunnel current between the probe and a substrate, movable ions or atoms of the mixed-conductive material are transferred onto the substrate to thereby fabricate a nano-structure on the substrate.

BRIEF DESCRIPTION OF THE DRAWINGS

FIG. 7 is a photograph relating to the embodiment of the present invention and showing the atomic structure of a silicon surface observed by use of, as an STM probe, an $Ag_2S$ crystal having a silver projection (mini chip) formed on the tip end thereof.

BEST MODE FOR CARRYING OUT THE INVENTION

An embodiment of the present invention will now be described in detail.

Figure 1:
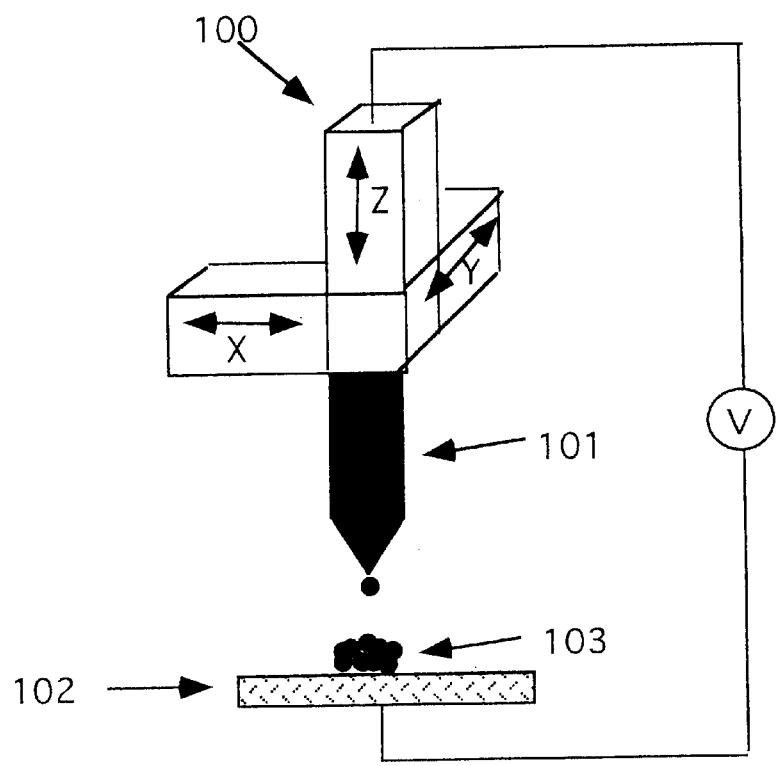
FIG. 1 is a schematic view showing a conventional scanning tunneling microscope and the principle of a method of fabricating a nano-structure by use of the scanning tunneling microscope.
Figure 2:
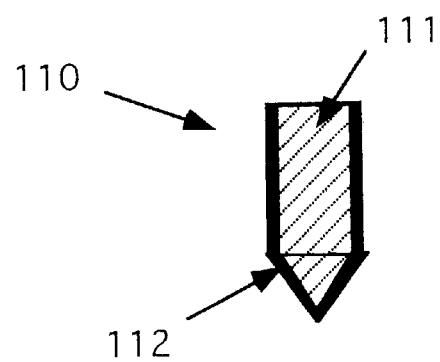
FIG. 2 is a view showing a probe of another conventional scanning tunneling microscope.
Figure 3:
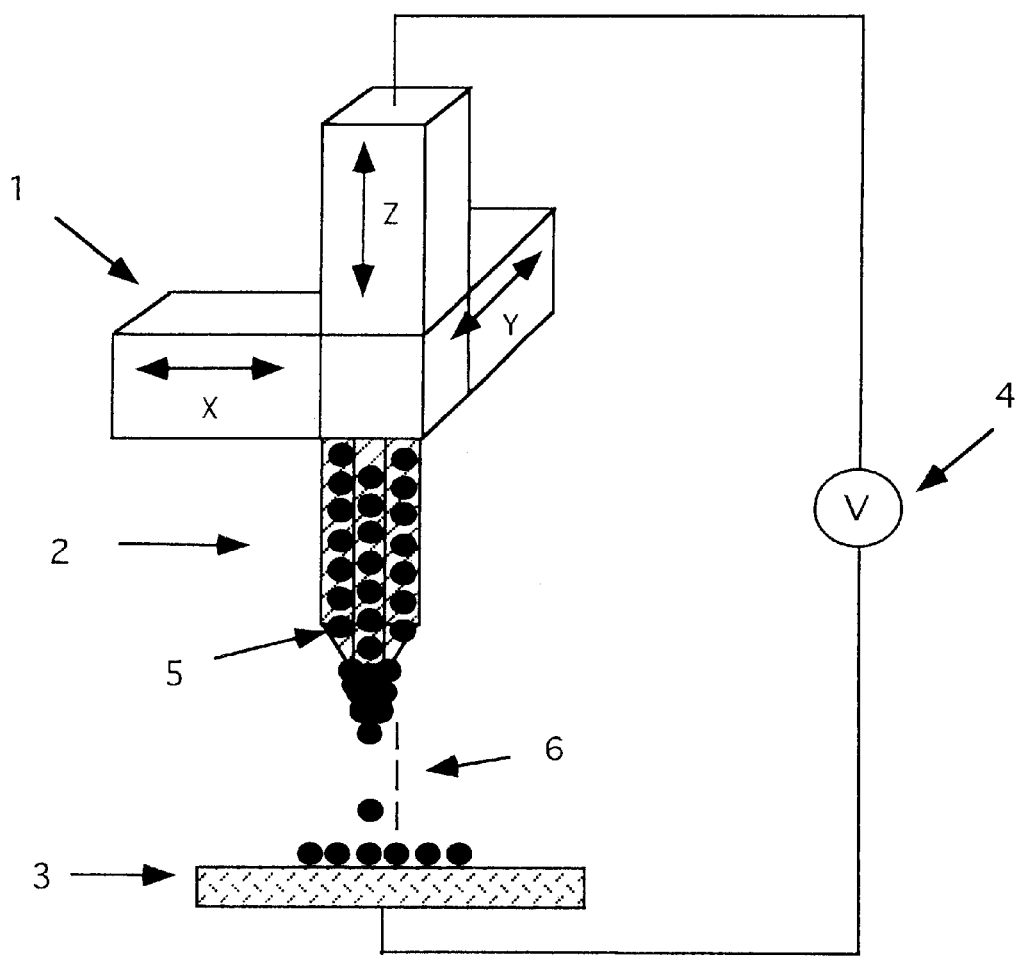
FIG. 3 is a schematic view showing a scanning tunneling microscope according to an embodiment of the present invention and the principle of a method of fabricating a nano-structure by use of the scanning tunneling microscope.

FIG. 3 is a schematic view showing a scanning tunneling microscope according to an embodiment of the present invention and the principle of a method of fabricating a nano-structure by use of the scanning tunneling microscope.

In FIG. 3, reference numeral 1 denotes a three-dimensional drive unit; and 2 denotes an STM probe connected to the three-dimensional drive unit 1. The STM probe 2 is formed of a mixed-conductive material having both ion conductivity and electron conductivity. Reference numeral 3 denotes a substrate; 4 denotes a power supply for supplying voltage and current; 5 denotes movable ions; and 6 denotes tunnel current. The power supply 4 applies voltage and current between the STM probe 2 and the substrate 3 to thereby generate the tunnel current 6.

The scanning tunneling microscope (STM) is an effective apparatus for enabling fabrication of nano-structures of nanometer or atomic scale on a proper substrate. In order to fabricate a nano-structure through transfer of atoms from a probe of the STM, the STM probe must satisfy two requirements; i.e., "capability of observing a structure fabricated on a substrate surface so as to check the fabricated structure" and "capability of continuously transferring metal atoms or other atoms from the tip of the probe onto the substrate."

However, as described in the background art section, for conventional techniques of fabricating nano-structures by use of an STM, it has been difficult to continuously transfer metal atoms from a probe onto a substrate.

In the present invention, as shown in FIG. 3, the STM probe 2 is formed of a crystal of a mixed-conductive material in which ions and electrons can move easily. Use of the STM probe 2 formed of a mixed-conductive material enables a structure on a substrate surface to be observed with ease through utilization of tunnel current flowing due to electron conductivity, and also enables movable ions or atoms to be continuously supplied from the tip of the STM probe 2 onto a substrate through utilization of the movable ions 5 flowing due to the ion conductivity.

In the present embodiment, among various types of mixed-conductive materials, an $Ag_2S$ crystal which permits conduction of silver ions and electrons is used for the STM probe in order to enable observation of a structure on a substrate surface and fabrication of a nano-structure through supply of silver atoms from the probe onto the substrate.

A method of fabricating a nano-structure according to the embodiment of the present invention will now be described.

[1] First, a mixed-conductive $Ag_2S$ crystal to be used as an STM probe is fabricated through vapor growth. Specifically, in order to enable use as an STM probe, a needle-shaped single crystal is fabricated while the growth rate and growth direction of the monocrystal are controlled (step S1).

Figure 4:
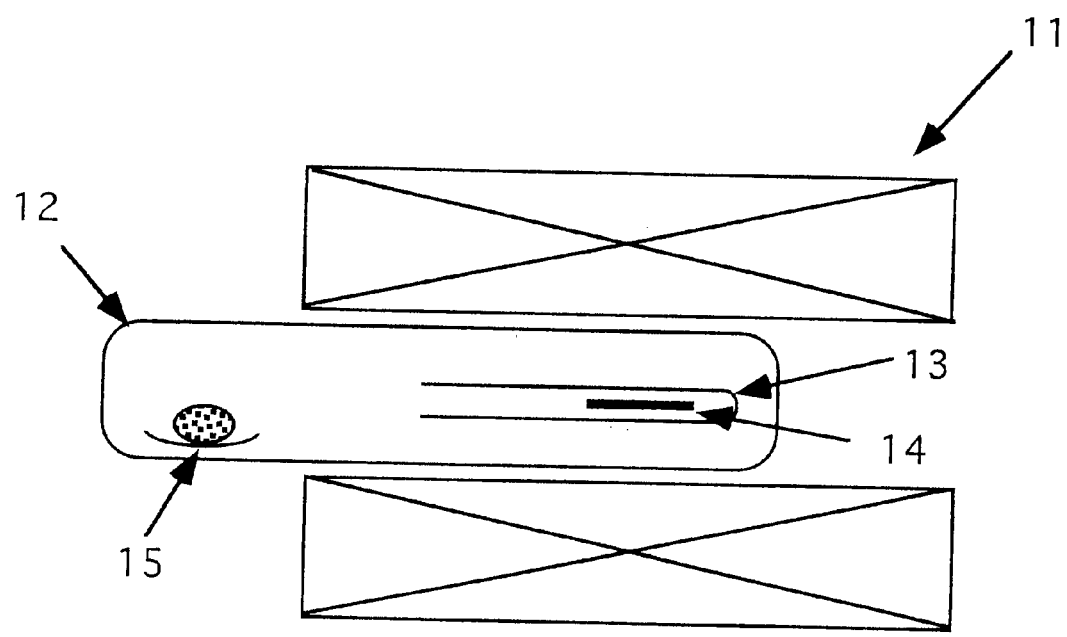
FIG. 4 is a schematic view showing the structure of an apparatus for growing an $Ag_2S$ crystal which is used as a probe of the scanning tunneling microscope according to an embodiment of the present invention.

FIG. 4 is a schematic view showing the structure of an apparatus for growing an $Ag_2S$ crystal which is used as a probe of the scanning tunneling microscope according to an embodiment of the present invention.

In FIG. 4, reference numeral 11 denotes an electric furnace; 12 denotes a glass tube; 13 denotes a capillary tube; 14 denotes a silver wire; and 15 denotes sulfur powder.

As shown in FIG. 4, the silver wire 14 and the sulfur powder 15 are enclosed under vacuum in the glass tube 12. Through reaction of the silver wire 14 and sulfur gas generated from the sulfur powder 15, an $Ag_2S$ crystal is grown at the tip end of the silver wire 14. At this time, the $Ag_2S$ crystal is grown in a needle-like shape to thereby enable use of the single crystal as an STM probe. For such a purpose, the silver wire 14 is placed in the capillary tube 13 having a closed end, in order to control the growth direction and rate of the $Ag_2S$ crystal. Further, the silver wire 14 and the sulfur powder 15 within the glass tube 12 are maintained at proper temperatures through control of the electric furnace 11, to thereby control the growth rate of the $Ag_2S$ crystal.

Figure 5:
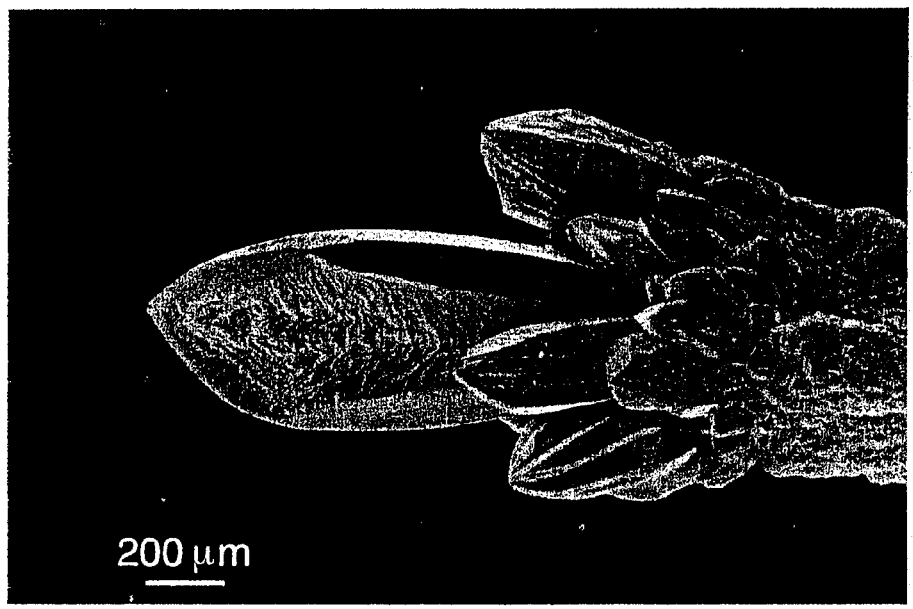
FIG. 5 shows a needle-shaped $Ag_2S$ crystal which is grown on a silver wire by use of the apparatus shown in FIG. 4.

FIG. 5 shows a needle-shaped $Ag_2S$ crystal which is grown on the silver wire in accordance with the above-described method.

The $Ag_2S$ crystal on the silver wire is used as an STM probe.

[2] When the thus-fabricated $Ag_2S$ crystal is used as an STM probe as is, the tip end of the STM probe is not sufficiently sharp, with the result that a surface structure of a substrate cannot be observed. Therefore, a proper voltage and tunnel current are applied between a probe formed of the $Ag_2S$ crystal and a substrate in order to move movable silver ions within the $Ag_2S$ mixed-conductive crystal to the tip end of the probe, and to precipitate them on the $Ag_2S$ surface in the form of silver atoms. Through precipitation of a large number of silver atoms on the surface, a silver projection composed of silver atoms is grown on the tip end of the probe made of the $Ag_2S$ crystal. When the $Ag_2S$ crystal having the projection (mini chip) grown on the tip end thereof is used as an STM probe, observation of the surface structure of a substrate and a micro-structure fabricated on the substrate surface becomes possible. (step S2)

Next, fabrication of a silver projection on an $Ag_2S$ crystal and observation of the surface structure of a substrate by use of a probe formed of the $Ag_2S$ crystal will be described.

Figure 6:
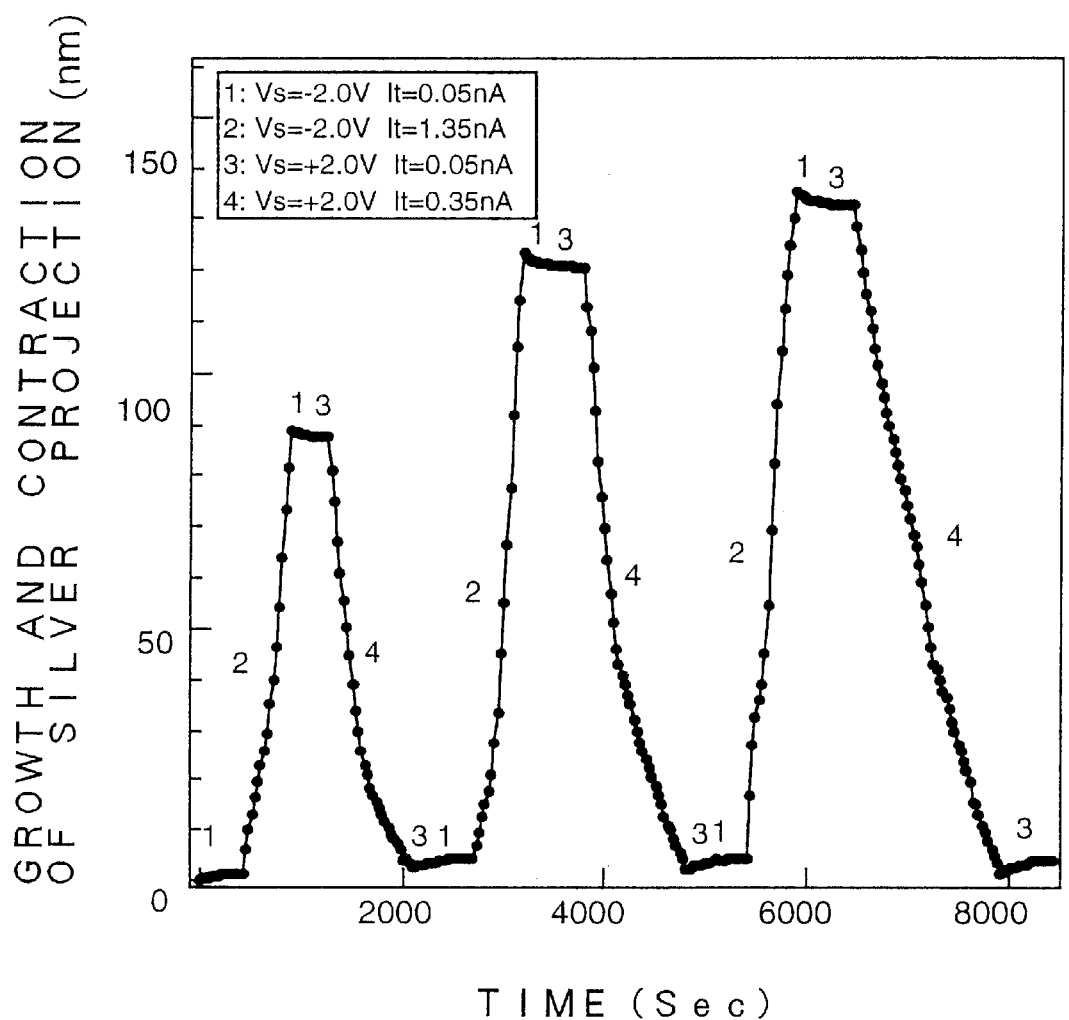
FIG. 6 is a graph showing a process of growth of a silver projection on the tip end of a probe of the scanning tunneling microscope.

The above-described $Ag_2S$ crystal is used as an STM probe; and a proper voltage and tunnel current are applied between the probe and a substrate in order to grow a silver projection on the tip end of the probe. FIG. 6 shows a process of growth of such a silver projection.

Under the condition of sample bias voltage (Vs) being negative and tunnel current (It) being small (condition 1 in FIG. 6: Vs=−2.0 V, It=0.05 nA), growth of a silver projection does not occur. However, the growth of a silver projection starts when thd tunnel current is increased (condition 2 in FIG. 6: Vs=−2.0 V, It=1.35 nA).

Further, when the polarity of the sample bias voltage (Vs) is changed to positive, under the condition of the tunnel current (It) being small (condition 3 in FIG. 6: Vs=2.0 V, It=0.05 nA), no change occurs in the grown silver projection. However, the silver projection contracts (the silver atoms of the projection return into the $Ag_2S$ crystal) when the tunnel current is increased (condition 4 in FIG. 6: Vs=2.0 V, It=0.35 nA).

That is, the silver projection can be extended and contracted through inversion of the polarity of the applied voltage. The growth of the silver projection occurs in such a manner that, due to the effects of voltage and tunnel current applied between the probe and the substrate, movable silver ions within the $Ag_2S$ mixed-conductive crystal move to the tip end of the probe and precipitate from the interior of the mixed-conductive crystal onto the surface thereof in the form of silver atoms.

By contrast, the contraction of the silver projection occurs through a reaction which is the reverse of the reaction during the above-described growth process, which reverse reaction is caused by inversion of the polarity of the applied voltage. When the $Ag_2S$ mixed-conductive monocrystal having a silver projection grown on the tip end thereof is used as an STM probe, observation of the surface structure of a substrate and a nano-structure fabricated on the substrate surface becomes possible, because the silver projection on the tip end of the $Ag_2S$ crystal serves as a mini chip.

FIG. 7 is a photograph relating to the embodiment of the present invention and showing the atomic structure of a silicon surface observed by use of, as an STM probe, an $Ag_2S$ crystal having a silver projection (mini chip) formed on the tip end thereof.

(3) Next will be described a method of fabricating a nano-structure on a substrate by use of an STM probe formed of $Ag_2S$. Through application of proper voltage and tunnel current between the substrate and an STM probe formed of an $Ag_2S$ crystal having a silver projection grown on the tip end thereof, silver ions or silver atoms moving within the $Ag_2S$ crystal are continuously transferred from the tip end of the STM probe onto the substrate. At this time, the probe is scanned over the substrate in order to fabricate a nano-structure on the substrate by use of the silver atoms (step S3).

Figure 8:
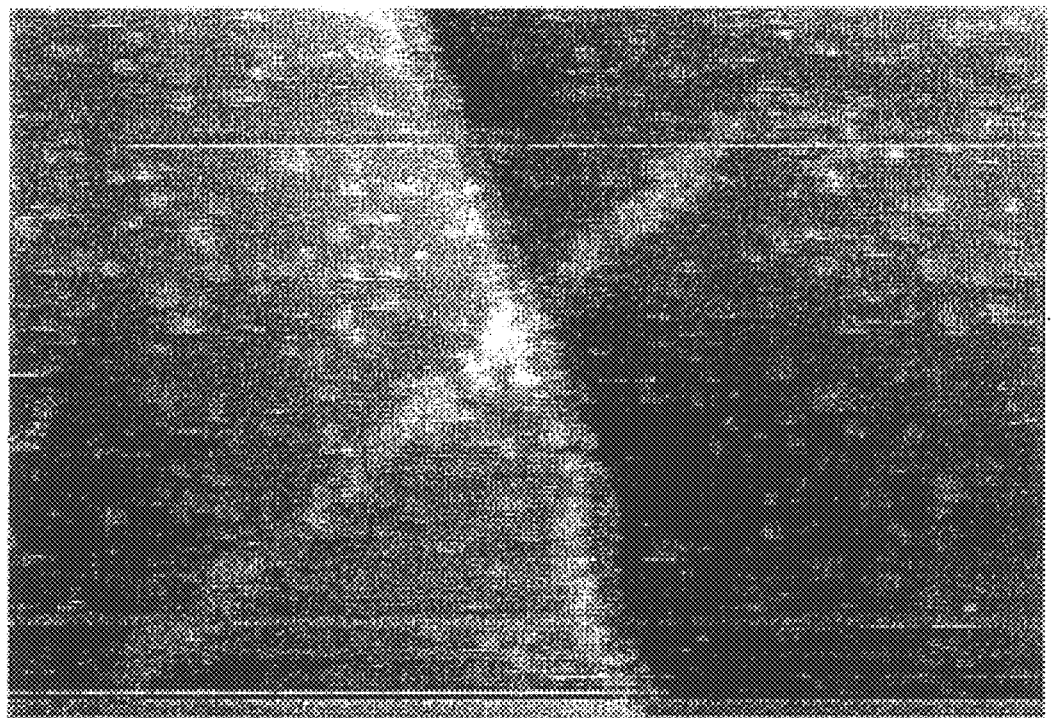
FIG. 8 is a photograph relating to the embodiment of the present invention and showing a thin-wire-like nano-structure fabricated on a silicon substrate, the nano-structure having a width of about 15 nm, a length of about 150 nm, and a thickness of about 0.3 nm.

FIG. 8 shows a thin-wire-like nano-structure fabricated on a silicon substrate and having a width of about 15 nm, a length of about 150 nm, and a thickness of about 0.3 nm.

The present invention is not limited to the above-described embodiments. Numerous modifications and variations of the present invention are possible in light of the spirit of the present invention, and they are not excluded from the scope of the present invention.

As described above, the present invention achieves the following effects.

(A) Use of an STM formed of a mixed-conductive material facilitates observation of a surface structure of a substrate performed by use of tunnel current flowing due to electron conductivity, and also enables movable ions or atoms to be continuously supplied from the tip of the STM probe onto a substrate through utilization of movable ions flowing due to ion conductivity, thereby enabling easy fabrication of a continuous nano-structure.

(B) Among various types of mixed-conductive materials, an $Ag_2S$ crystal which permits conduction of silver ions and electrons is used as an STM probe, so that observation of a structure of a substrate surface and fabrication of a nano-structure through supply of silver atoms from the probe onto the substrate can be performed.

(C) A thin-wire-like nano-structure having a width of about 15 nm, a length of about 150 nm, and a thickness of about 0.3 nm can be fabricated on a silicon substrate.

INDUSTRIAL APPLICABILITY

The scanning tunneling microscope, the probe for use with the scanning tunneling microscope, the method of treating the probe, and the method of fabricating a nano-structure by use of the probe, all according to the present invention, can be applied to observation of an atomic structure of a substrate surface and fabrication of a continuous structure of a nanometer scale.

What is claimed is:

1. A scanning tunneling microscope comprising a probe formed of a $Ag_2S$ crystal having both ion conductivity and electron conductivity and means to apply a voltage and tunnel current between said probe and a substrate.

2. A scanning tunneling microscope according to claim 1, wherein the probe has a projection which is provided on the tip end of the $Ag_2S$ crystal and is grown or contracted through application of voltage and tunnel current between the probe and a substrate.

3. A method of treating a probe for a scanning tunneling microscope comprising the steps of:
   (a) preparing a probe for a scanning tunneling microscope formed of a $Ag_2S$ crystal having both ion conductivity and electron conductivity;
   (b) applying voltage and tunnel current between the probe and a substrate in order to move movable Ag ions within the $Ag_2S$ crystal to thereby grow, on the tip end of the probe, a projection composed of the Ag ions; and
   (c) reversing the polarity of the applied voltage after the growth of the prtojcction in order to return the Ag ions constituting the grown projection into the $Ag_2S$ crystal to thereby contract the projection.

4. A method of observing a nano-structure on the surface of a substrate, comprising applying a tunnel current between the substrate and a probe treated by the method according to claim 3.

5. A method of fabricating a nano-structure by use of a scanning tunneling microscope comprising:
   utilizing an $Ag_2S$ crystal, having both ion conductivity and electron conductivity, as a probe for the microscope; and
   applying voltage and tunnel current between the probe and a substrate to cause movable ions or atoms of the $Ag_2S$ crystal to transfer onto the surface of the substrate and to thereby fabricate the nano-structure.

* * * * *

UNITED STATES PATENT AND TRADEMARK OFFICE
CERTIFICATE OF CORRECTION

PATENT NO. : 6,608,306 B1
DATED : August 19, 2003
INVENTOR(S) : Aono et al.

It is certified that error appears in the above-identified patent and that said Letters Patent is hereby corrected as shown below:

<u>Title page,</u>
Item [75], Inventors, "Wako", both instances, should read -- Saitama --.

<u>Column 6,</u>
Line 49, "prtojcction" should read -- projection --.

Signed and Sealed this

Thirteenth Day of April, 2004

JON W. DUDAS
*Acting Director of the United States Patent and Trademark Office*